Sept. 21, 1965  H. G. ABBEY  3,207,337
KEY CARD DISPATCHED CONVEYOR SYSTEMS
Filed March 21, 1963  4 Sheets-Sheet 1

INVENTOR.
HAROLD G. ABBEY
BY
ATTORNEY

Sept. 21, 1965 H. G. ABBEY 3,207,337
KEY CARD DISPATCHED CONVEYOR SYSTEMS
Filed March 21, 1963 4 Sheets-Sheet 2

INVENTOR.
HAROLD G. ABBEY
BY
ATTORNEY

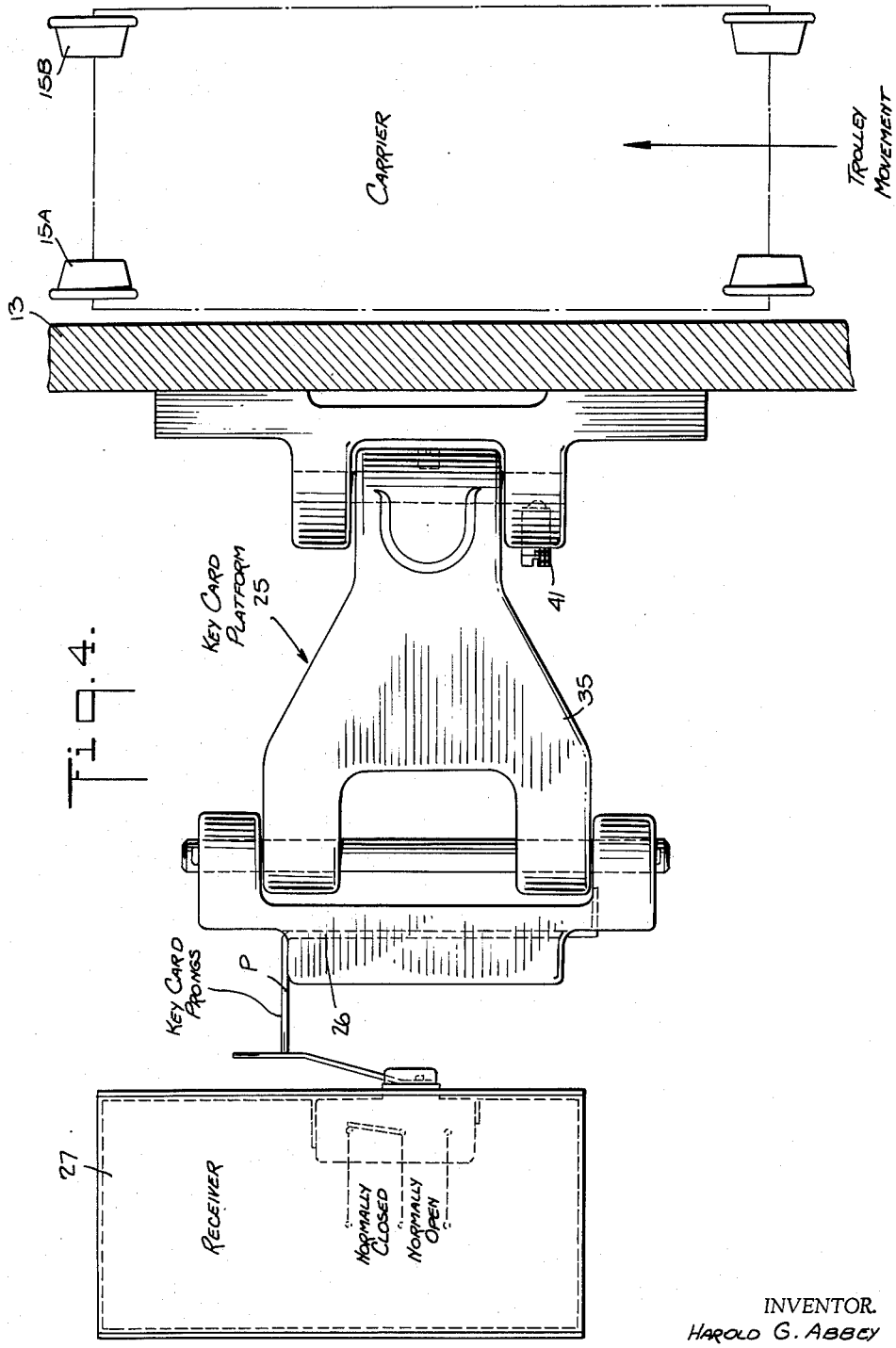

Sept. 21, 1965 H. G. ABBEY 3,207,337
KEY CARD DISPATCHED CONVEYOR SYSTEMS
Filed March 21, 1963 4 Sheets-Sheet 4
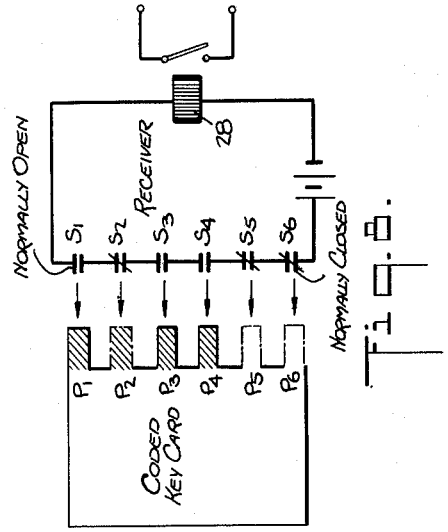
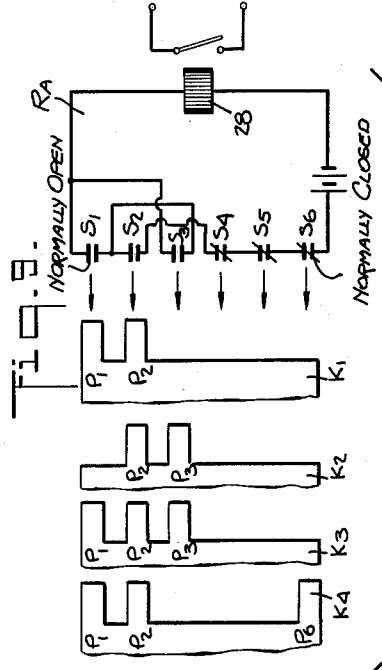
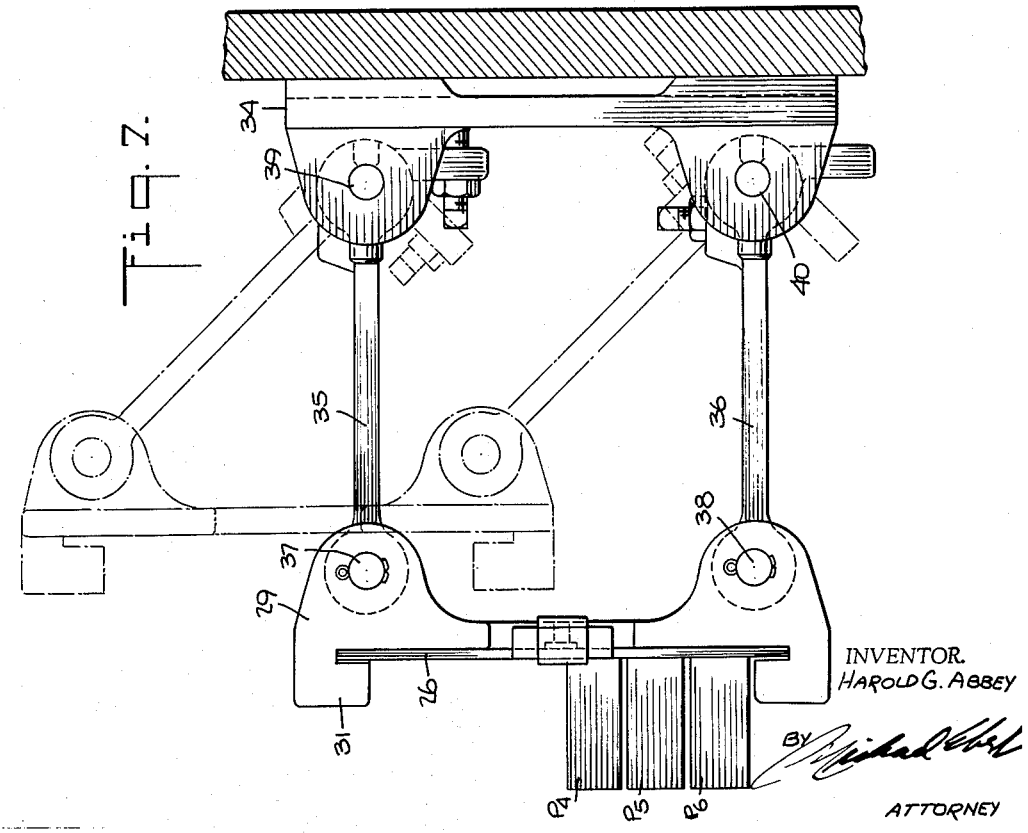
INVENTOR.
HAROLD G. ABBEY
ATTORNEY

United States Patent Office 3,207,337
Patented Sept. 21, 1965

3,207,337
KEY CARD DISPATCHED CONVEYOR SYSTEMS
Harold G. Abbey, 189—10 Aberdeen Road,
Jamaica, N.Y.
Filed Mar. 21, 1963, Ser. No. 266,925
9 Claims. (Cl. 214—89)

The present invention relates generally to conveyor systems in which work carriers are automatically conveyed to selected operating stations, and more particularly to a dispatching arrangement for a multi-process or multi-destination system for selectively directing and activating the movements of individual carriers whereby the carriers are automatically routed and piloted throughout the system in accordance with a predetermined program. This application is a continuation-in-part of my copending Abbey application Serial No. 114,583, filed April 18, 1961, entitled "Key Card Dispatched Conveyor Systems."

In my Patents Nos. 2,854,159, 2,987,201, 2,975,882, and 2,979,181, there are disclosed conveyor structures including a plurality of work carriers movable on an overhead track for travel to various work stations therebelow, the track being provided with removable rail segments vertically aligned with the stations. Individual elevators are provided for the removable segments, the work carrier being supported on the rail segment as it is lowered by the associated elevator to a work station.

Acting in conjunction with each removable segment is a substitute segment which automatically replaces the removable segment when it is lowered, thereby re-establishing the continuity of the track and permitting uninterrupted passage of carriers. Thus no gaps are permitted to remain in the track and the flow of traffic thereon is maintained. This makes possible a leap-frog operation in which, as one carrier occupies a down or work position, the next carrier bypasses the occupied station to continue its travel to an assigned station.

In order to facilitate automatic, unattended operations with a conveyor system of the above-described type, there is disclosed in the above-identified copending Abbey application, individual and selective control of each carrier independently of the preceding or following carriers to effect the desired dispatching and cycle destination for that particular carrier. Thus, when a carrier enters a processing station, the elevator thereat is either actuated to lower the carrier for processing or it is unactuated to permit the carrier to bypass or skip the station, depending on the cycle requirements of the system. When the system is constituted by several processing lines of different types, the carrier is directed to the desired line as well as being instructed as to the work operation cycles to be carried out in the selected line.

In my above-identified copending Abbey application, I disclose a coded instruction system wherein each carrier bears a coded key card which at each operating point is intercepted by a receiver, the receiver acting to decode the key to generate a command signal for effecting an operation only if the proper code is presented, the carrier otherwise continuing beyond this point.

Also disclosed in this application is a binary code system wherein the receiver is provided with a series of binary relays which are selectively actuated by prongs of a key and whereby the binary symbol 0 is represented by the static condition of the relay and the symbol 1 by the operative condition thereof. The binary code combination produced in response to a particular key card is translated by an elaborate matrix of switches to provide an output signal when a proper code is presented.

Accordingly, it is the main object of this invention to provide a binary-coded instruction system of highly simplified and efficient design wherein a carrier is automatically pivoted through a cycle of operations by means of a coded key card which engages, at the various operating points in the system, a decoding receiver consisting essentially of a bank of binary switches which are so initially set and interconnected, that a single output relay is operated only when the switching bank intercepts specifically coded cards.

Also an object of the invention is to provide a simplified carrier instruction system in which coded key cards are binary-coded by means of different combinations of projecting prongs which engage selected actuating elements in a bank of binary switches, the switches being interconnected to produce an output signal only when a conductive path is established therethrough by the particular key combinations.

A further object of the invention is to provide a retractable platform for supporting a key card on a carrier, which platform may be raised to place the card in operative relation to receivers encountered in the course of carrier movement, or withdrawn to render the key card inoperative, whereby the carrier movement proceeds without interruption at the operating points until the card is restored to its operative position.

Briefly stated, these objects are accomplished in a coded instruction arrangement wherein each carrier conveys a key card having a series of code positions, prongs projecting at selected positions to define a code combination. At the various functioning points in the conveyor systems the key card is brought into operation relation with a receiver constituted by a like series of switches, each of which is normally in an open or closed state and which reverses its state momentarily when actuated. The switches are initially set to occupy one state or another and are so interconnected as to form a code network whereby when selected switches are engaged by the prongs of cards having specific codes, the resultant connections effect a conductive path through the network to produce a control signal which renders the functioning point operative.

For a better understanding of the invention as well as other objects and further features thereof, reference is made to the following detailed description to be read in conjunction with the accompanying drawings, wherein:

FIG. 1 schematically illustrates, in front elevation, a small portion of a conveyor system making use of automatic carrier control devices in accordance with the invention;

FIG. 4 is a plan view showing the key card cradle mounted on a movable carrier;

FIG. 7 shows in vertical elevation a swingable cradle for the key card holder;

FIG. 8 shows the schematic circuit diagram of the key card and receiver therefor to decode the card; and FIG. 9 is a schematic circuit showing a modified form of receiver arrangement.

Figure 1:
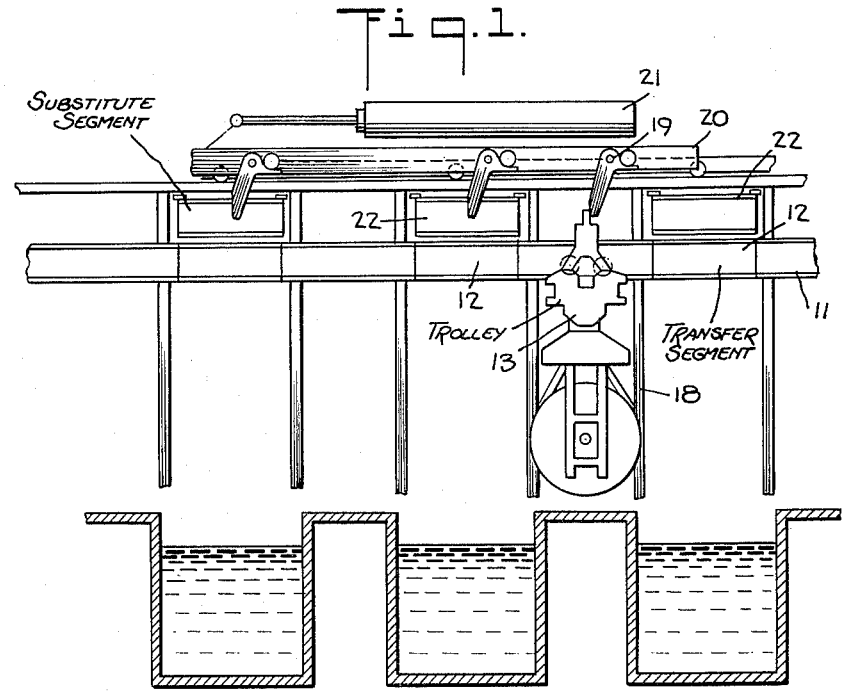
Figure 2:
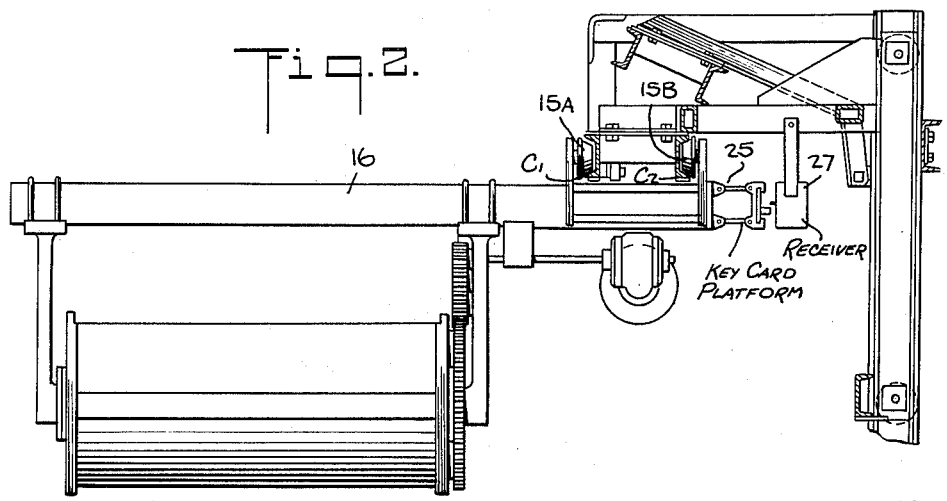
FIG. 2 is a side view showing a single trolley on a removable segment.

Referring now to the drawings, there is shown in FIGS. 1 and 2 a small section of an overhead conveyor and processing system. In practice, the complete system may take the form of a continuous trackway having a large number of stations for carrying out various operations such as chemical cleaning, plating, rinsing, drying, etc. The arrangement may be such that any of the work carriers is made to undergo any desired sequence of operations independently of the operating cycles of the other carriers in the system. Some of the many possible system arrangements and working applications therefor are disclosed in the above-identified Abbey patents and in said copending Abbey application.

The overhead, horizontally extending track 10 is constituted by a fixedly supported beam 11 and includes transfer rail segments 12 which normally lie in linear registration with the trackway but are removable therefrom. The rail segments 12 are in vertical alignment with the work stations therebelow.

Travelling along the track are a plurality of work carriers 13 which may support perforated cylindrical plating barrels 14 of non-conductive material, or plating racks. The conveyor may be used in conjunction with all types of cellular liquid treatment. For non-electrolytic treatments, metal cylinders may be used in place of the non-metallic barrels.

Carrier 13 is in the form of a trolley having two sets of wheels 15A and 15B which ride on either side of the trackway double rail $C_1$ and $C_2$ to transport the barrel to selected stations. While a wheeled trolley is shown herein, this is only necessary for heavy-duty operations. It is to be understood that slide-type trolleys may be used on light-duty work.

The barrel loads, as best seen in FIG. 2, are suspended eccentrically by a cantilever arm 16 from the trolley 13. This cantilever suspension acts to stabilize the trolley position for accurate, play-free horizontal movement, and also allows for variable size work loads with standardized modular conveying elements, reduced headroom requirements for leap-frogging, and displacement of the carrier conveyor and control mechanisms from the path of work.

Each transfer rail segment 12 is movable downwardly by means of an individual elevator 17 riding on vertical frame beams 18. The transfer segment 12 is mechanically attached to the frame of elevator 17 so that when the elevator chain or cable is driven, the segment may be lowered or raised thereby, depending on the direction of drive. When the rail segment is lowered with a work carrier thereon, the plating barrel is immersed in a processing tank at the work station.

The trolleys 13 of the several work carriers are indexed or shifted in a stepwise manner along the trackway in one direction by means of spaced pusher fingers 19 which are pivotally connected to a reciprocally-operated actuator bar 20, disposed above the rail and parallel thereto. The bar 20 is slidably supported and is driven in alternate directions at timed intervals by a suitable hydraulic device 21 or other means. For each forward stroke of the bar, the pusher finger 19 advances trolley 13 from one station to the next. Stops in the form of pivotal dogs or spring-actuated detents may be used for holding a carrier on a rail segemnt 12 or on a main track 11 to prevent displacement thereof.

Pivotally supported above each transfer rail segment is a substitute rail segment 22 which is an exact duplicate of segment 12. The arrangement is such that when the transfer segment 12 is lowered by elevator 17, the matching substitute segment 22 falls downwardly in place of the transfer segment so that no break exists in the continuity of the trackway and successive work carriers are able to proceed therealong without interruption and skip over any work carrier which has been lowered into a work station. Thus the withdrawal of one or more work carriers from the trackway does not act to delay the transfer of other carriers.

The elevators may be individually motor driven or operated by an automatic clutch mechanism from a master shaft. Alternatively, the elevators may be individually motor operated or piston-operated by air or hydraulic pressure. In any case, down and up control may be effected by an adjustable time switch for the motor or clutch, or by an adjustable motor timer, valve or cam for air or oil. The elevation of a carrier while another is passing over can be prevented by an electrical lockout for the motor, a mechanical or electrical lockout for the clutch or a valve lockout for the air or oil supply. In this connection, reference is made to Abbey Patent No. 2,854,159.

While the stations have been shown with uniform spacing therebetween, it will be appreciated that the spacing may be varied as desired and the elevator spacing adjusted accordingly. Elevator stations can be separated by long sections of fixed track with a continuous chain or cable conveying motion to the next station for pick-up by the reciprocating transfer. Any configuration of a complete cycle can be arranged as long as the loop is closed for the return of the carriers.

By combining the leap-frog and bypassing principles disclosed in the above-identified Abbey patents with the coded dispatching arrangement disclosed herein, it becomes possible to multiply the automated cycle selection possibilities. A great variety of process variations can be automatically cycled in a single system without manual assistance. Thus cleaning and other metal preparative steps can be integrated with plating and finishing in a single system and piloted by one operator.

The dispatch key cards in accordance with the invention function as automatic carrier pilots and control the electrical circuit combinations for directing and activating the movements of the carriers throughout the system. The key cards, which will be later described in detail, are each provided with contact prongs which actuate selected switches acting as binary elements on a fixed receiver unit when the carriers arrive at the various stations. The key cards act as program controls and, once inserted on a carrier, they pilot their loads unerringly from start to finish, all timing and movements being automatic. Key cards can be identified by process name, number or color.

Figure 3:
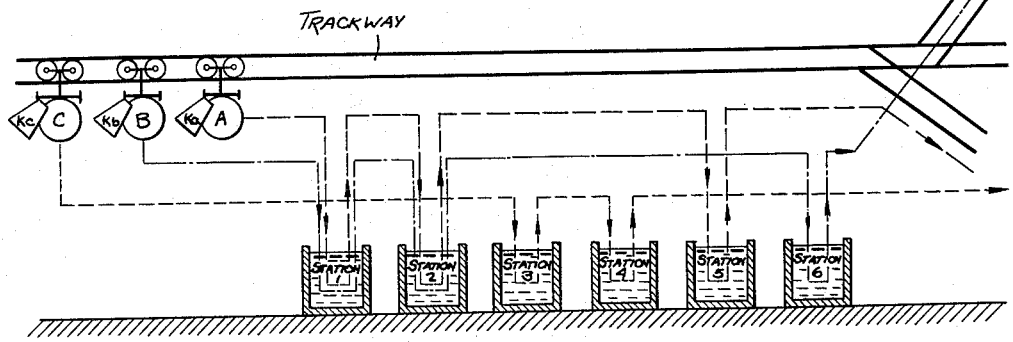
FIG. 3 illustrates schematically the operation of the system.

Referring now to FIG. 3, the piloting function of the key cards will be illustrated simply in connection with three carriers conveying work loads A, B and C along an overhead main line track T running past stations 1 through 6, and two switch points to side lines $L_1$ and $L_2$. Key cards $Ka$, $Kb$ and $Kc$ are inserted at a loading station into the three carriers to provide a program appropriate to each load. While the leap-frog feature is not shown in this simplified cycle selection illustration, it will be understood that in the event the processing time at an individual station requires a longer time than the production rate which is synonymous with the rate of carrier dispatching, multiple positions for stations 1, 2, 3 etc., would be provided to allow this greater time, and carriers will leap-frog into the available space at the selected station.

Carrier A, for example, may be instructed by key $Ka$ to dip into the process tank at stations 1, 2 and 5, and then switched to line 1. Carrier B is instructed by key $Kb$ to process at stations 1, 2 and 6, and then switch to line $L_2$. Carrier C is instructed to process by key $Kc$ at stations 3 and 4, and to continue along the main line. When switching into lateral lines, use is also made of transfer segments and substitute segments, in the manner described above. The action taken by each carrier is determined by the code combination on its key card, which code is analyzed or decoded at each functioning point in the conveyor system by a receiver, whereby if a particular code is presented, the receiver generates a command signal to render the functioning point operative with respect to the carrier bearing the code.

Figure 5:
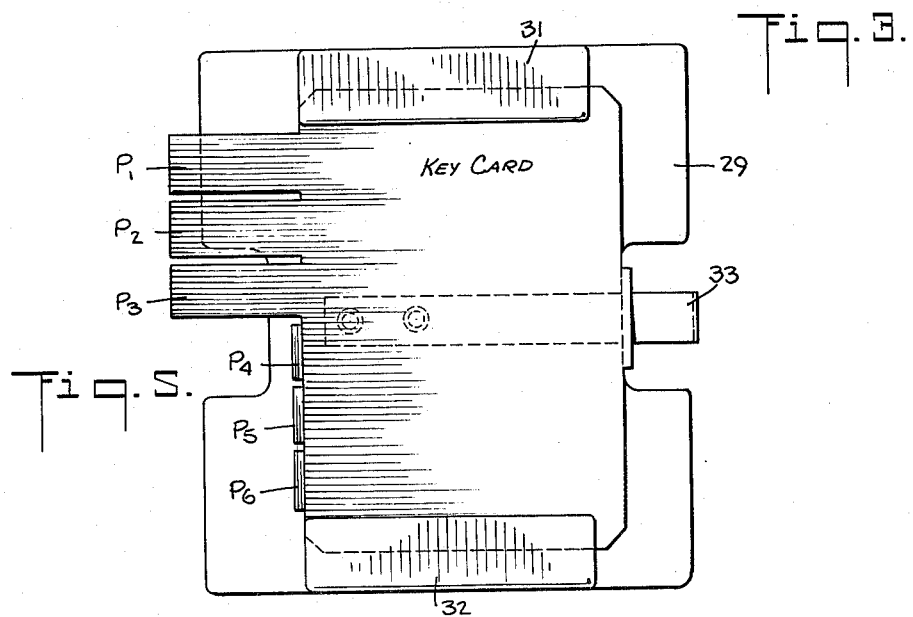
FIG. 5 is a side view of the key card in its holder.

Referring now to FIGS. 4–7, there is shown a single carrier 13 having trolley wheels 15A and 15B riding on the conveyor trackway. Mounted on the side of the carrier as well as on every other carrier in the system, is a retractable platform, generally designated by numeral 25, for supporting a key card 26. The card, as best seen in FIG. 5, is constituted by a metal plate having a series of six binary code positions represented by prongs $P_1$ to $P_6$. Specific code combinations are formed by bending selected prongs at right angles to the plane of the card, whereby they are then in a position to engage the actuating elements of a bank of switches in the receiver encountered at each functioning point in the conveyor system. For purpose of illustration, prongs $P_4$, $P_5$ and $P_6$ in FIG. 5 are shown bent to provide in effect a 0-0-0-1-1-1 binary combination.

Figure 6:
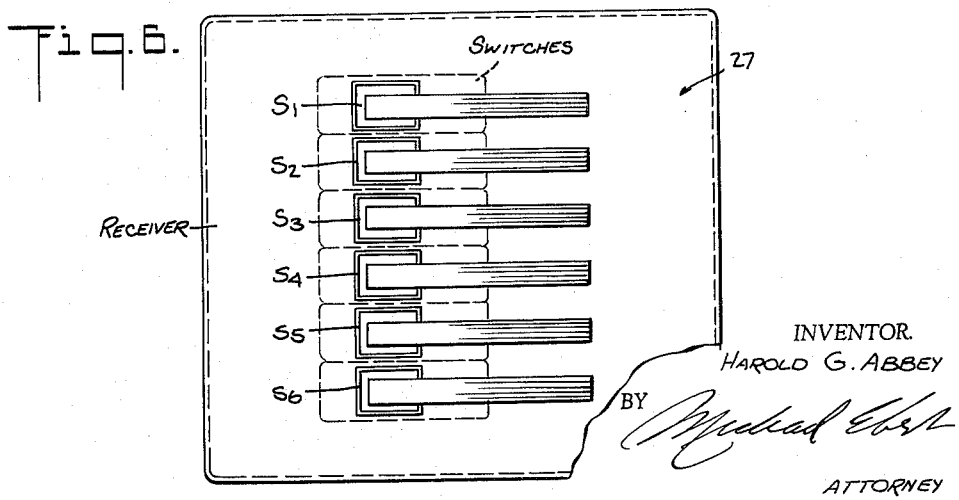
FIG. 6 is a side view of the bank of switches in the receiver.

Fixedly mounted at the various functioning points in the system are receivers 27, one of which is shown in FIGS. 6 and 7. Each receiver includes a bank of switches S equal in number to the prongs on the key card, and in alignment therewith, whereby a bent prong P on the card is engageable with the actuating element E of the switch in its path of travel, as shown for prong $P_6$ in the drawing.

Referring to FIG. 8, there is shown schematically a sample key card K having a series of six prong positions, of which prongs $P_1$, $P_3$ and $P_4$ are bent to engage the actuating element E in a like series of switches $S_1$ to $S_6$ in a receiver R. Each of the switches is normally open or closed, the normally closed position being indicated symbolically by a slant line.

By way of example, switches $S_1$, $S_3$ and $S_4$ are shown normally open, while switches $S_2$, $S_5$ and $S_6$ are normally closed. Thus prong $P_1$, when it engages the actuating element of switch $S_1$ in the course of carrier movement, momentarily closes this switch, and prongs $P_3$ and $P_4$ effect momentary closure of switches $S_3$ and $S_4$. The normally closed switches $S_2$, $S_5$ and $S_6$ maintain their state, for there are no bent prongs at these positions to effect a switch over. Consequently, a conductive path is produced through the chain of series-connected switches, all of which are closed when the key K is in the operative position.

When the key departs this station, the switches are restored to the original state shown in FIG. 8, and the circuit is broken.

When the conductive path is formed in the switching network, an energized circuit is completed to relay 28, which is actuated to close a switch or switches for effecting whatever action is called for at the station or operating point in question. It will be evident that the only key card which will bring about a conductive condition in receiver R, as shown, is the $P_1$, $P_3$, $P_4$ key card, and any other code combination will fail to actuate the receiver. For example, the presence of a prong $P_6$ will open switch $S_6$ and thereby break the circuit. In binary terms, each prong represents an "0" or a "1," depending on whether it is extended or not, and the number of permutations $2^6-1$, or 63 keys, by all possible combinations of 1 to 6 prongs. It is therefore possible with the arrangement shown in FIG. 8, to have 63 differently connected receivers, each of which will respond to only one specifically coded key card.

In FIG. 9, switches $S_1$, $S_2$ and $S_3$ in receiver $R_A$ are normally open, while switches $S_4$, $S_5$ and $S_6$ are normally closed, switch $S_1$ being parallel with switch $S_3$ and connected in series with switches $S_2$, $S_4$, $S_5$ and $S_6$. When, therefore, a key $K_1$ with prongs $P_1$ and $P_2$ is brought into operative relationship with this receiver, a conductive path will be created despite the fact that switch $S_3$ remains open, for this switch is shunted by the momentarily closed switch $S_1$. Similarly, the card $K_2$ with prongs $P_2$ and $P_3$ will actuate the receiver, as will key $K_3$ with prongs $P_1$, $P_2$, and $P_3$, for in all cases a conductive path is formed in the network.

When, however, a key $K_4$ approaches with prongs $P_1$, $P_2$, $P_6$, the prong $P_6$ will momentarily open the normally closed switch $S_6$, and thereby break the conductive circuit otherwise formed. It will be seen, therefore, that keys $K_1$, $K_2$ and $K_3$ borne by different carriers will bring about an operation at the station at which receiver $R_A$ is installed, but no other card will carry out this function. On the other hand, at another station, if the receiver is identical to that in FIG. 8, with the exception that switch $S_6$ is normally open rather than closed, the receiver so arranged will respond to key card $K_4$ but not to cards $K_1$, $K_2$ and $K_3$.

Because the receivers conform to the binary code with the normally closed switches representing the "0" position and the normally open switches the "1" position, no other key can close the signal circuit other than that key which momentarily converts "0's" to "1" to produce a conductive chain.

In actual practice, where it is desired to have more than one carrier stop at the same station, and a different number stop at other stations, this can be accomplished by different switch network arrangents, as shown, for example, in FIG. 8.

The retractable platform 25 for the key card 26, as shown in FIGS. 4 and 7, includes a holder 29 having jibs 31 and 32 for receiving the card, and a retaining spring 33 for keeping the card in place on the platform. The holder 29 is supported on a base plate 34 secured to the side of the carrier by means of a pair of link members 35 and 36 whose forked upper arms are pivotally connected by shafts 37 and 38 to the holder. The feet of the link members are pivotally connected to the base plate 34 by means of shafts 39 and 40 journaled in bearings thereon.

The links define a parallelogram, and when the links are perpendicular to the base plate, the holder is outstretched to bring the key card into operative relation to the receivers as it travels in the horizontal plane, as shown in FIG. 4. The only way by which the platform can be retracted is by striking the holder in the vertical direction, as shown in FIG. 4.

Thus when the carrier is moved downwardly, a fixed stop may be arranged at the lowermost position to engage the lower edge of holder 29 to cause the holder to swing on its linkage toward the carrier, as shown in dotted lines. The extended or retracted position of the platform is maintained by detents 41 acting on the shafts 39 and 40. The key card holder position may be restored by its forward movement past a sheet-metal or other type of cam to push it back to its contact position. This retractable feature is useful when the carrier has processed through a multiple station and no further processing is desired.

In practice, the binary switches which are normally closed and which when engaged by a key card prong are momentarily opened to break the switching network circuit and thereby prevent an action at the station are arranged to function before the other switches which are normally open. The purpose of this is to prevent a false action, for if the circuit breaking switch action is delayed the receiver circuit may be rendered conductive. This may be accomplished by having extended actuating elements for these normally closed switches which are engaged by prongs before the other switches.

While there has been shown preferred embodiments of my invention, it will be understood that many changes may be made therein within the spirit of the invention as hereinafter defined in the claims.

What is claimed is:

1. In a conveyor system wherein carriers are conveyable on a trackway for transporting work to be acted upon at selected points therealong, control means being provided at each point to effect an action with respect to carriers selecting the point; a replaceable key card borne by each carrier to instruct said carrier to take predetermined actions relative to selected points along said trackway, a stationary receiver adjacent each point to engage the key card on the carrier arriving thereat, said receiver producing a signal only when the incoming card is properly coded relative thereto, said signal being applied to said control means to effect the described action, each key card having a series of binary code positions thereon wherein a particular code combination is defined by elements projecting from selected positions in said series, said receiver having a like series of switches having actuator members aligned with said key positions to engage said elements, each of said switches being in a normally open or closed state and being momentarily reversed in state when actuated, at least one switch in the series being normally open while another switch in said series is normally closed, said switches being so interconnected in a binary code network whereby when selected switches are actuated by key cards having operative codes, the resultant connections complete a conductive path to produce said signal.

2. In a conveyor system as set forth in claim 1, wherein the switches of the receiver are connected serially, those switches in the network which are not to be actuated by key cards having an operative code being normally closed, the remaining switches which are actuated being normally open, whereby when the operative key arrives, the remaining switches are momentarily closed to complete the conductive path.

3. In a conveyor system as set forth in claim 1, wherein the switches of the receiver are connected in a series chain, in which at least one of the switches is shunted across another.

4. In a conveyor system as set forth in claim 1, wherein each key card is constituted by a plate having a series of projecting prongs, some of which are bent relative to the plane of the plate to assume postures engaging the actuators of the switches.

5. In a conveyor system as set forth in claim 1, wherein said key cards are supported on said carriers by means of a retractable platform which may be raised to place the card in operative relation to receivers encountered in the course of carrier movement or withdrawn to render the key card inoperative.

6. In a conveyor system, a trackway having operating points extending between a starting point and a terminal point, a plurality of carriers conveyable on said trackway for transporting work to be acted upon at selected points therealong, control means at each point to effect an action with respect to carriers selecting the point, a replaceable key card borne by each carrier to instruct said carrier to take predetermined actions relative to selected points, and a stationary receiver adjacent each point to engage the key card on the carrier arriving thereat, said receiver producing a signal only when the incoming card is properly coded relative thereto, said signal being applied to said control means to effect the desired action, each key card having a series of binary code positions thereon wherein a particular code is defined by elements projecting from selected positions in said series, said receiver having a like series of switches provided with actuator members aligned with said key positions to engage said elements, each of said switches being in a normally open or closed state and being momentarily reversed in state when actuated, at least one switch in the series being normally open while another switch in said series is normally closed, said switches being so interconnected in a binary code network whereby when selected switches are actuated by key cards having specific code combinations, the resultant connections complete a conductive path to produce said signal.

7. In a conveyor system, a trackway having operating points extending between a starting point and a terminal point, a plurality of carriers conveyable on said trackway for transporting work to be acted upon at selected points therealong, at least one point having an elevator to carry the carrier down to a work station, control means at each point to effect an action with respect to carriers selecting the point, a replaceable key card borne by each carrier to instruct said carrier to take predetermined actions relative to selected points, a stationary receiver adjacent each point to engage the key card on the carrier arriving thereat, said receiver producing a signal only when the incoming card is properly coded relative thereto, said signal being applied to said control means to effect the desired action, each key card having a series of binary code positions thereon wherein a particular code is defined by elements projecting from selected positions in said series, said receiver having a like series of switches provided with actuator members aligned with said key positions to engage said elements, each of said switches being in a normally open or closed state and being momentarily reversed in state when actuated, at least one switch in the series being normally open while another switch in said series is normally closed, said switches being so interconnected in a binary code network whereby when selected switches are actuated by key cards having specific codes, the resultant connections complete a conductive path to produce said signal, and when the operating point includes said elevator the signal initiates the operation of said elevator.

8. In a conveyor system as set forth in claim 7, wherein said key cards are supported on said carriers by means of a retractable platform which may be raised to place the card in operative relation to receivers encountered in the course of carrier movement or withdrawn to render the key card inoperative, said work station including an abutment adapted to engage said platform when the carrier is lowered and the platform is retracted.

9. The combination of a plurality of carriers conveyable on a trackway for transporting work to be acted upon at selected points therealong, control means at each point to effect an action with respect to carriers selecting the point, a replaceable key card borne by each carrier to instruct said carrier to take predetermined actions relative to selected points, a stationary receiver adjacent each point to engage the key card on the carrier arriving thereat, said receiver producing a signal only when the incoming card is properly coded relative thereto, said signal being applied to said control means to effect the desired action, each key card having a series of binary code positions thereon wherein a particular code is defined by elements on selected positions in said series, said receiver having a like series of switches having actuator members aligned with said key positions to engage said elements, each of said switches being in a normally open or closed state and being momentarily reversed in state when actuated, at least one switch in the series being normally open while another switch in said series is normally closed, said switches being so interconnected in a binary code network whereby when selected switches are actuated by key cards having specific codes, the resultant connections complete a conductive path to produce said signal.

References Cited by the Examiner

UNITED STATES PATENTS

| | | | |
|---|---|---|---|
| 2,502,960 | 4/50 | Johnson. | |
| 2,757,781 | 8/56 | Freeman | 198—38 |
| 2,803,333 | 8/57 | Freeman | 198—38 |
| 2,876,888 | 3/59 | Auliffe | 198—38 |
| 2,975,882 | 3/61 | Abbey | 214—89 X |
| 2,997,154 | 8/62 | Lahm | 198—19 |

HUGO O. SCHULZ, *Primary Examiner.*